Figure 1:
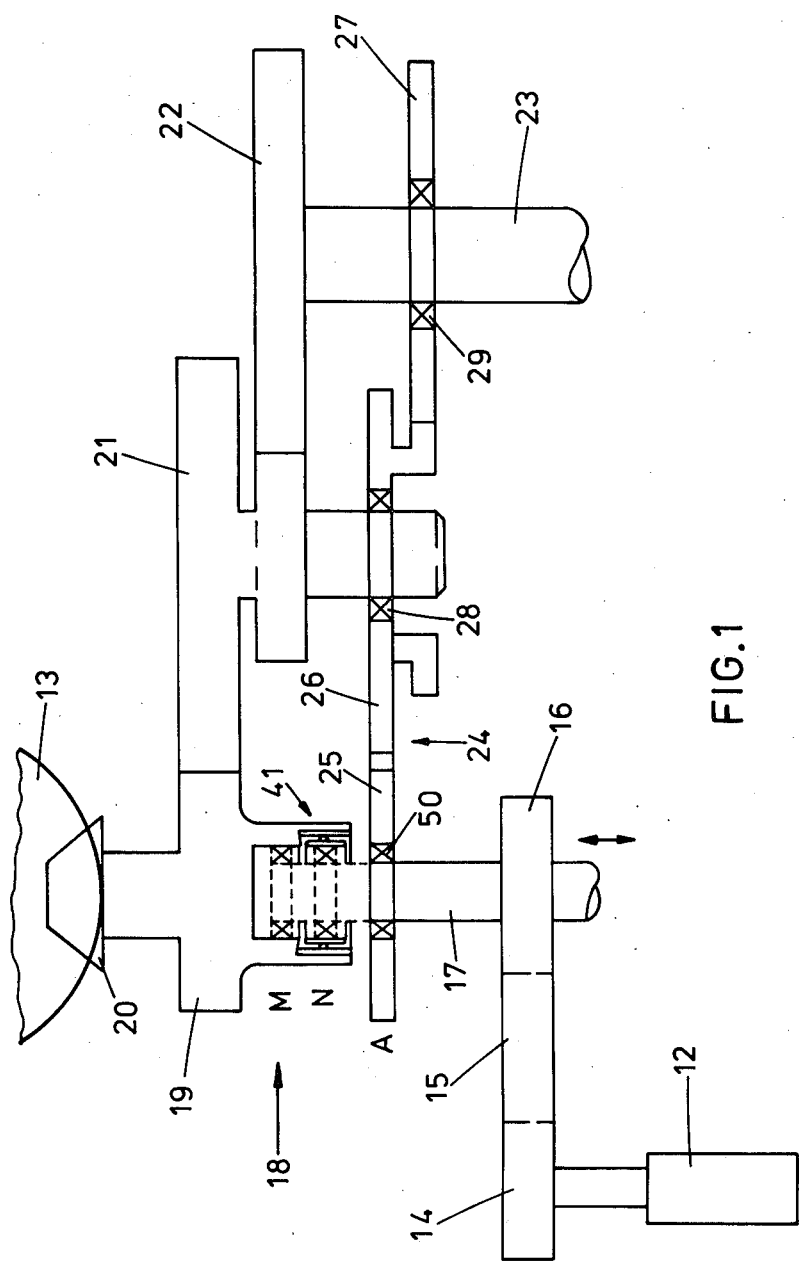

United States Patent [19]
Watson et al.

[11] 4,441,384
[45] Apr. 10, 1984

[54] FREEWHEEL DEVICES

[75] Inventors: Kenneth Watson, Yeovil; Richard G. Buswell; James E. Saunders, both of Sherborne, all of England

[73] Assignee: Westland plc, Yeovil, England

[21] Appl. No.: 164,905

[22] Filed: Jul. 1, 1980

[30] Foreign Application Priority Data

Jul. 26, 1979 [GB] United Kingdom ............... 7926018

[51] Int. Cl.³ .......................................... F16H 37/06
[52] U.S. Cl. ......................... 74/665 GA; 74/665 GC; 192/96
[58] Field of Search ............ 192/4 C, 47, 48.92, 192/96; 74/661, 665 A, 665 R, 665 B, 665 F, 665 G, 665 GA, 665 L, 665 N, 665 Q

[56] References Cited

U.S. PATENT DOCUMENTS

| 1,647,932 | 11/1927 | Pozder | 192/71 |
| 1,943,057 | 1/1934 | Bush | 192/96 |
| 1,947,033 | 2/1934 | Bush . | |
| 2,861,461 | 11/1958 | Kreidler | 192/71 |
| 3,380,564 | 4/1968 | Beurer | 192/47 |
| 3,554,338 | 1/1971 | Kennedy, Jr. | 192/48.92 |
| 4,284,183 | 8/1981 | Brisabois et al. | 192/47 |

FOREIGN PATENT DOCUMENTS

| 583355 | 8/1933 | Fed. Rep. of Germany | 192/48 |
| 1304961 | 12/1962 | France | 74/665 GA |
| 589079 | 2/1959 | Italy | 74/665 A |
| 7712492 | 11/1977 | Netherlands | 74/665 N |
| 363772 | 12/1931 | United Kingdom . | |
| 1232683 | 5/1971 | United Kingdom | 192/96 |
| 1541718 | 3/1979 | United Kingdom . | |

*Primary Examiner*—Leslie A. Braun
*Assistant Examiner*—D. Wright
*Attorney, Agent, or Firm*—Larson and Taylor

[57] ABSTRACT

A freewheel device for connecting a power input to a selected one of a plurality of outputs so as to transmit rotary motion in one direction of rotation and to overrun when the speed of the selected one of the outputs exceeds that of the input, includes a neutral condition in which the input is rotationally disengaged from any of the outputs. In a described embodiment, the freewheel device comprises a plurality of rollers retained circumferentially adjacent one end of an axially movable shaft in operative association with a plurality of wedge-shaped portions formed on the shaft, axial movement of the shaft serving to engage the rollers between the wedge-shaped portions and, selectively axially spaced-apart internal, cylindrical surfaces formed on each of the outputs and on a rotatable support.

The freewheel device finds particular application in the transmission system of multi-engined helicopters.

6 Claims, 2 Drawing Figures

FREEWHEEL DEVICES

DESCRIPTION OF INVENTION

This invention relates to freewheel devices, particularly but not exclusively to such devices for incorporation in a helicopter transmission system and to a helicopter transmission system incorporating same.

In multi-engine helicopters it is common practice to incorporate an actuatable freewheel in the transmission system in order to disengage the main rotor drive from one of the engines so that the engine is drivingly connected only to an accessory gearbox to enable accessories such as hydraulic pumps etc., to be operated prior to engaging the main rotor drive during start-up, and also to be checked on the ground without starting all engines and the main rotor.

An example of such a freewheel currently used for this purpose is described and illustrated in U.K. Patent Specification Ser. No. 1,541,718. In this arrangement, a plurality of roller bearings are located between inner and outer races one of which is provided with wedge-shaped portions equal in number to the number of roller bearings. Means are provided to urge the rollers up or down the wedge-shaped portions to engage and disengage the freewheel respectively. In the event that the rotational speed of the driven member exceeds that of the driving member, the freewheel over-runs due to the rollers automatically moving back down the wedge-shaped portions.

Whilst this prior arrangement has proven to be satisfactory in the drive from one engine of a twin-engined helicopter in connecting its respective engine either to an accessory gearbox or to a main rotor, a problem was encountered in attempting to incorporate a similar design into the drive from one of the engines of a three-engined helicopter. This arose by reason of the third engine being required during certain phases of operation only, e.g., take-off and hover, and being shut-down for the majority of each flight during cruise, which means that the driven member of the prior type freewheel would be over-running (at a very high speed of the order of 12,000 r.p.m.) all the time that the engine was shut-down.

It was evident that this would result in rapid wear and deterioration of the freewheel and would require an unacceptable level of maintenance activity.

Accordingly, in one aspect, the present invention provides a freewheel device having a power input selectively connectible to a plurality of outputs by means for transmitting rotary motion from the input to a selected output in one direction of rotation and to over-run when the speed of said output exceeds that of the input, characterised in that said freewheel has a neutral condition in which said input is rotationally disengaged from all of said outputs and in which said transmitting means is isolated from rotary motion of any one of said outputs.

Preferably, the input is rotationally fixed to an axially movable shaft having a plurality of rollers retained circumferentially at one end thereof in operative association with a plurality of wedge-shaped portions formed on the shaft and equal in number to the number of rollers. The outputs may be axially spaced-apart each having an internal cylindrical surface located concentrically of the axis of the shaft so that axial movement of the shaft engages the rollers between the wedge-shaped portions on the shaft and the internal cylindrical surface of a selected one of said outputs.

The neutral condition of the freewheel device may be attained by locating the shaft with the rollers intermediate two of the outputs. The freewheel may further comprise a rotatably mounted support member having an internal cylindrical surface located concentrically of the axis of the shaft and of similar diameter to the internal cylindrical surfaces of the outputs, and adapted to be engaged by the rollers in the neutral condition.

Conveniently, the support member may comprise an inner race of a ball bearing, an outer race of the ball bearing being rotationally fixed in a supporting structure.

The supporting structure may comprise a skirted portion formed integral with one of the outputs and extending axially therefrom.

The other end of said shaft may have axially extending splines formed on an external cylindrical surface thereof for engagement in mating splines formed on an internal cylindrical surface of the input. The shaft may be connected to actuating means arranged to selectively move the shaft axially in order to engage the freewheel device in any desired one of its operational positions.

The actuator may be connected through an actuating rod extending into a bore in the shaft and having an inner end secured in a ball bearing fixedly mounted in said bore.

In another aspect, the invention provides in a multi-engined helicopter transmission system a freewheel device actuatable between a first condition in which rotational movement of an input gear is transmitted by transmitting means to a first output gear arranged to drive a helicopter rotor system, a second condition in which rotational movement of the input gear is transmitted to a second output gear arranged to drive an accessory gear train, the freewheel device being arranged to over-run should the rotational speed of a connected output gear exceed that of the input gear, and a third condition in which the input gear is rotationally disengaged from the first and second output gears and in which the transmitting means is isolated from rotary motion of either of the first or second output gears.

Figure 2:
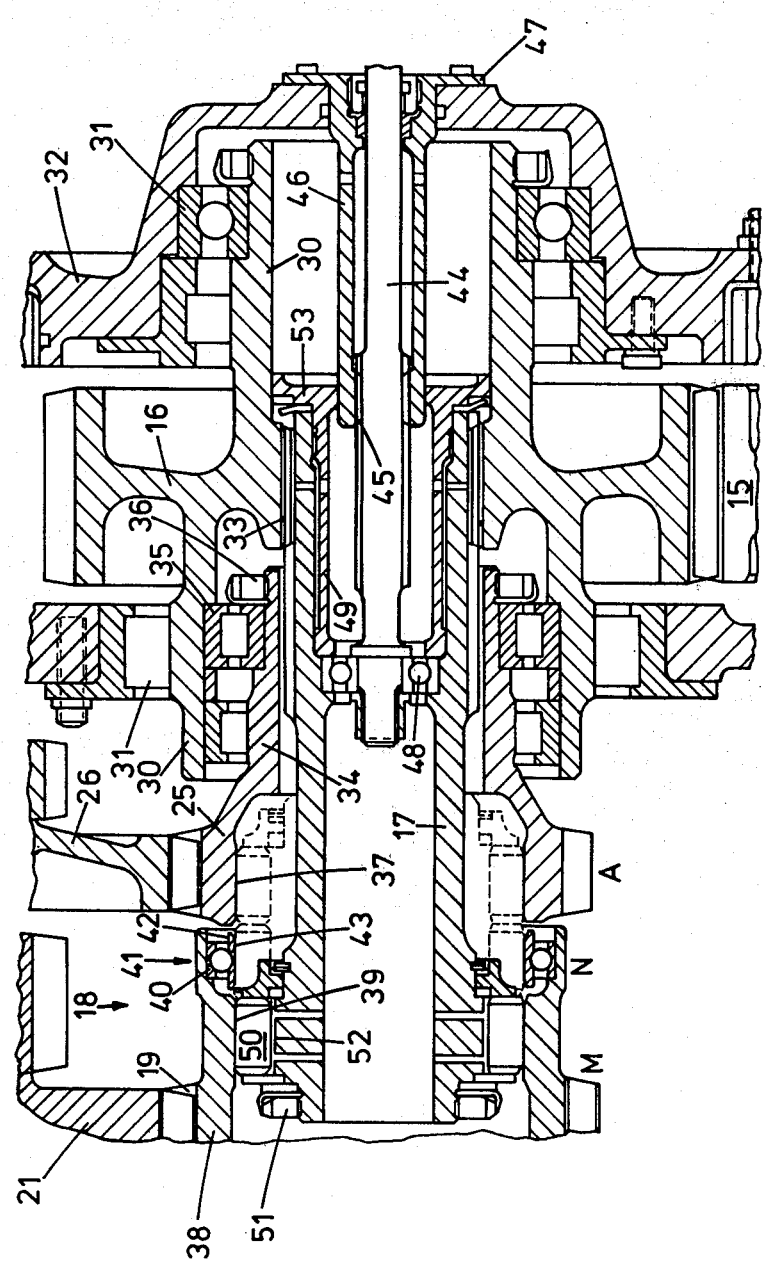

The invention will now be described by way of example only and with reference to the accompanying drawings in which, FIG. 1 is a schematic illustration of part of a helicopter transmission system, and FIG. 2 is a fragmentary sectioned side elevation of part of the transmission system of FIG. 1 and incorporating a freewheel device constructed in accordance with one embodiment of the invention.

FIG. 1 illustrates part of a transmission system from one engine 12 only of a three-engined helicopter, the overall transmission system serving to drivingly connect the engines to a combining gear 13 rotationally fixed to a helicopter main rotor shaft. In one particular configuration, the illustrated engine 12 is located on a helicopter fuselage at the rear of the main rotor shaft, and the remaining two engines (not shown) are located one at each side of a longitudinal centerline of the fuselage and forward of the main rotor shaft.

Engine 12 is connected through a helical gear 14 and an idler gear 15 to a freewheel device generally indicated at 18 and including an input gear 16 rotationally fixed to an axially movable shaft 17.

The freewheel device 18 includes transmitting means disposed at an end of the shaft 17, and has three conditions respectively attained by axially spaced-apart positions of the shaft 17 identified as M (main), N (neutral) and A (accessory). Axial movement of the shaft 17 selects the desired operational condition of the freewheel device 18 as will be described hereinafter in more detail.

A first output gear 19 is arranged co-axially with the shaft 17 for engagement in certain phases of operation by the freewheel device 18, and carries a spiral bevel gear 20 in mesh with the main rotor combining gear 13. Gear 19 is meshed with a gear 21 which in turn drives a gear 22 rotationally fixed to a tail rotor drive shaft 23.

A second output gear 25 is located co-axially of the shaft 17 and is axially spaced-apart from gear 19 for engagement in certain phases of operation by the freewheel device 18. Gear 25 is in mesh with an accessory gear train generally indicated at 24 and including gears 26 and 27 arranged to drive various helicopter accessories such as hydraulic pumps, etc. It will be noted that, in the illustrated embodiment, gears 26 and 27 are mounted on freewheels 28 and 29 supported by a stub shaft on gear 21 and by tail rotor drive shaft 23 respectively. Freewheels 28 and 29 are non-actuatable freewheels of conventional design.

Referring now to FIG. 2, in which like reference numerals are used to identify the parts previously described, idler gear 15 is shown in mesh with input gear 16 which is an annular gear having axially extending portions 30 supported in bearings 31 carried by a housing 32. An internal cylindrical surface of gear 16 is provided with axially extending splines 33 engaged in mating splines formed on an external surface of hollow shaft 17.

Output gear 25, which meshes with gear 26 forming part of the accessory gear train 24 (FIG. 1) is an annular gear located concentrically of the shaft 17 and axially spaced-apart from gear 16. Gear 25 includes an axially extending portion 34 located internally of the adjacent portion 30 of gear 16, and is supported therefrom by a bearing 35 retained by nut 36.

An internal cylindrical surface 37 at the opposite end of gear 25 is provided for a purpose to be explained hereinafter in more detail.

Output gear 19, shown in part only in FIG. 2, is a further annular gear axially spaced-apart from gear 25 and supported from the housing 32 by bearings (not shown) concentrically of shaft 17. The gear 19 has an annular portion 38 extending axially towards gear 25 and having an internal cylindrical surface 39 corresponding in diameter to internal surface 37 of gear 25.

The end of portion 38 has an increased internal diameter supporting an outer race 40 of a ball bearing generally indicated at 41. An inner race 42 of bearing 41 is located concentrically of shaft 17 and has an internal cylindrical surface 43 corresponding in diameter with the internal surfaces 37 and 39 of gears 25 and 19 respectively. In the illustrated embodiment, inner race 42 is extended axially at both its ends with respect to outer race 40 to form a support member for the freewheel device 18 in one phase of operation.

The internal surfaces 37, 39 and 43 are, therefore, all of similar diameter, are axially spaced-apart with relation to the shaft 17 and are concentric with the shaft 17.

An actuating rod 44 extends inwardly through the housing 32 into the bore of the shaft 17 and is located by mating axial splines 45 formed on a sleeve 46 having a flange portion 47 bolted to an external surface of the housing 32. An outer end of rod 44 is connected to an electric actuator (not shown), and an inner end is located in the bore of shaft 17 and is attached thereto by a ball bearing 48 located by a threaded sleeve 49 having a head portion 53 provided with an external cylindrical surface arranged for sliding engagement in an internal surface of portion 30 of gear 16.

The shaft 17 is, therefore, capable of rotation relative the rod 44, and axial movement of the rod 44 by the actuator will cause corresponding axial movement of the shaft 17.

The means for transmitting rotation from the input gear 16 to a selected one of the output gears 19 and 25 comprises a plurality of circumferentially arranged rollers 50 located at the end of shaft 17 and retained between rotatable washers by a threaded nut 51. This arrangement minimises wear damage of the rollers whilst permitting their necessary rotational and circumferential movement during operation. An external surface 52 of shaft 17 associated with the rollers 50 is formed with a plurality of wedge-shaped portions equal in number to the number of rollers 50 and in the manner of existing freewheels well known in the art.

In operation, axial movement of the shaft 17 will result in a corresponding axial movement of the rollers 50 so that the rollers 50 are operationally positioned between wedge-shaped portions 52 on the shaft 17 and a selected one of the internal cylindrical surfaces 39, 43 and 37 respectively, these axial positions being identified in FIG. 2 as M (main), N (neutral) and A (accessory) in accordance with the identification in FIG. 1. The rollers 50 are shown in full line in the M (main) position in FIG. 2 and in broken line in both of the N (neutral) and A (accessory) positions.

Operation of the freewheel device 18 will now be described firstly in relation to the general principles involved as illustrated in the embodiment of FIG. 2, then in relation to its particular application in a helicopter transmission system as illustrated schematically in FIG. 1.

Rotation of input gear 16 is transmitted through mated splines 33 to rotate the hollow shaft 17. With the rollers 50 in the M (main) position shown in full line in FIG. 2, this rotational movement of the shaft 17 causes the rollers 50 to move up the wedge-shaped portions formed on external surface 52 of shaft 17, thereby jamming the rollers 50 against the internal cylindrical surface 39 of the first output gear 19 causing rotation of the gear 19 with the shaft 17.

Operation of the actuator (not shown) to move the rod 44 fully to the right as viewed in FIG. 2 brings the rollers 50 into the A (accessory) position and into operational contact with the internal cylindrical surface 37 as shown in broken line in FIG. 2, thereby to transmit, in the manner previously described, rotary motion between the input gear 16 and the second output gear 25. It will be understood that the device 18 acts in the manner of a normal freewheel in the event of overspeeding of the connected one of the output gears 19 and 25, and will over-run due to the rollers 50 moving back down the wedge-shaped portions of surface 52.

Axial movement of the shaft 17 sufficient to locate the rollers 50 in the central neutral position N brings the rollers 50 into operational engagement with the internal cylindrical surface 43 of the inner race 42 of bearing 41. In this event, rotation of the shaft 17 causes jamming of the rollers 50 against the surface 43 causing rotation of the bearing 41 so that rotational movement is not transmitted to output gear 19. More importantly, in this neutral condition, the present arrangement ensures isolation of the rollers 50 of the freewheel device 18 in the event of rotation of the output gear 19 when the shaft 17 is stationary.

When incorporated in the transmission system of a three-engined helicopter as shown in FIG. 1 and as hereinbefore described, the freewheel device 18 operates as follows. During start-up, the shaft 17 is located axially so that the rollers 50 are in the A (accessory) position shown in full line in FIG. 1, and engine 12 is started to rotate shaft 17 through gears 14 and 15 and input gear 16. Output gear 25 is rotated by the rollers 50 of the freewheel device 18 to operate the accessory gear train 24 to provide desired hydraulic and power supplies, etc. In this phase of operation, freewheels 28 and 29 over-run. The speed of engine 12 is gradually increased to normal operating speed, the gear ratio of the accessory gear train 24 being arranged so that in this condition, the accessory gear train 24 is operating at about 96 percent of its normal speed.

The remaining two engines (not shown) are then started to rotate the main rotor through the combining gear 13, and their speed is gradually increased to normal operating speed. Rotation of the combining gear 13 is transmitted through bevel gear 20, and gears 19, 21 and 22 to rotate the tail rotor drive shaft 23, and the combining gear 13 also takes over the drive of the accessory gear train 24 through freewheel 28, thus over-running freewheel device 18 in the A (accessory) position due to rotation of gear 25 at a slightly higher speed than shaft 17. The remaining freewheel 29 remains in a slight over-run condition.

The speed of engine 12 is then reduced to an idle condition, and the shaft 17 is moved axially so that the rollers 50 are in the M (main) position as shown in broken line in FIG. 1, whereafter the speed of engine 12 is increased to normal thus engaging drive through freewheel device 18 so that all three engines contribute to the power required for take-off.

During cruise flight, sufficient power is available from two of the three engines, and engine 12 is shut-down to conserve fuel. The speed of engine 12 is firstly reduced to idle speed thus over-running the freewheel device 18. The shaft 17 is moved axially to locate the rollers 50 in the N (neutral) position and engine 12 is shut-down.

This maneuver is facilitated by the arrangement of the parts as shown in FIG. 2 in which the bearing 41 is carried by the output gear 19 so that, prior to engaging the rollers 50 in the N (neutral) position, the bearing 41 is rotating at the same speed as the gear 19. Once the rollers 50 are in the N (neutral) position, the bearing 41 takes out the rotational speed of gear 19 so that the rollers 50 remain stationary with the shaft 17. In the helicopter application previously described this neutral condition of freewheel device 18 means that, although the output gear 19 is rotating at normal operating speed, i.e. about 12,000 r.p.m. and the shaft 17 is stationary, the rollers 50 are isolated from this relative rotation and are not, therefore, subjected to a continuous high speed over-run condition that would otherwise be the case and which would result in rapid wear and deterioration of the freewheel device 18.

The freewheel 29 interposed between the tail rotor drive shaft 23 and the accessory gear train 24 provides an added safety factor in that in the event of a failure of the freewheel 28, the accessory gear train is driven through freewheel 29 from the tail rotor drive shaft 23.

We claim as our invention:

1. A transmission system for a multi-engined helicopter includes a freewheel device comprising an axially movable input shaft having a plurality of rollers retained around the shaft and adapted to transmit rotary motion from the shaft to a selected one of a plurality of axially spaced-apart output gears and to over-run when the speed of rotation of the selected output gear exceeds that of the shaft, each output gear having an internal cylindrical surface located concentrically of the shaft axis so that axial movement of the shaft engages the rollers with the selected output gear, said freewheel including a freely rotatable support means axially spaced-apart from the output gears, said support means comprising a ball bearing having inner and outer races, the inner race having an internal cylindrical surface located concentrically of the shaft and of a similar diameter to the internal surfaces of the output gears, whereby selective axial movement of the shaft to a neutral position engages the rollers with the support means so as to be rotationally disengaged from any of the output gears and isolated from independent rotary motion of any one of said output gears.

2. A freewheel device as claimed in claim 1 wherein the outer race of said ball bearing is rotationally fixed in a supporting structure.

3. A freewheel device as claimed in claim 2, wherein said supporting structure comprises a skirted portion formed integral with one of said output gears and extending axially therefrom.

4. A freewheel device as claimed in claim 1, wherein one end of said shaft has axially extending splines formed on an external cylindrical surface thereof for engagement in mating splines formed on an internal cylindrical surface of the said input.

5. A freewheel device as claimed in claim 4, wherein said shaft is connected to actuating means arranged to selectively move the shaft axially in order to engage the freewheel device in any desired one of its operational positions.

6. A freewheel device as claimed in claim 5, wherein said actuator is connected through an actuating rod extending into a bore in said shaft and having an inner end secured in a ball bearing fixedly mounted in said bore.

* * * * *